(12) United States Patent
Hosmer et al.

(10) Patent No.: US 8,157,450 B2
(45) Date of Patent: Apr. 17, 2012

(54) WAVEFORM EXPANSION SLEEVE FOR A BEARING

(75) Inventors: Christopher E. Hosmer, Greer, SC (US); Donald L. Nisley, Greenville, SC (US)

(73) Assignee: Baldor Electric Company, Fort Smith, AR (US)

( * ) Notice: Subject to any disclaimer, the term of this patent is extended or adjusted under 35 U.S.C. 154(b) by 782 days.

(21) Appl. No.: 12/196,689

(22) Filed: Aug. 22, 2008

(65) Prior Publication Data
US 2010/0046867 A1    Feb. 25, 2010

(51) Int. Cl.
*F16C 35/077*    (2006.01)

(52) U.S. Cl. ......... 384/535; 384/462; 384/474; 384/537

(58) Field of Classification Search .......... 384/462, 384/474, 495–498, 535–537, 558, 581, 582, 384/584, 906; 403/372
See application file for complete search history.

(56) References Cited

U.S. PATENT DOCUMENTS

| | | | |
|---|---|---|---|
| 1,970,024 A | 8/1934 | Stockfleth | |
| 2,283,839 A * | 5/1942 | Wright | 384/536 |
| 2,397,164 A * | 3/1946 | Shafer | 384/495 |
| 2,439,269 A * | 4/1948 | Shafer | 384/536 |
| 2,469,483 A * | 5/1949 | Strong | 384/536 |
| 2,539,782 A | 1/1951 | Kell | |
| 2,553,337 A | 5/1951 | Shafer | |
| 3,061,386 A | 10/1962 | Dix et al. | |
| 3,157,444 A | 11/1964 | Scheel | |
| 3,372,963 A * | 3/1968 | Harris | 384/537 |
| 3,433,539 A | 3/1969 | Nigh | |
| 3,499,654 A * | 3/1970 | Lower | 277/362 |
| 3,807,819 A * | 4/1974 | Zimmer et al. | 384/558 |
| 3,829,182 A * | 8/1974 | Struttmann | 384/558 |
| 3,977,740 A * | 8/1976 | Struttmann | 384/558 |
| 3,981,550 A * | 9/1976 | Zimmer et al. | 384/558 |
| D247,781 S | 4/1978 | DiLoreto | |
| 4,981,390 A | 1/1991 | Cramer, Jr. et al. | |
| D337,336 S | 7/1993 | Losdahl | |
| 5,536,090 A * | 7/1996 | Nisley | 384/474 |
| D385,892 S | 11/1997 | Kawai | |
| D401,597 S | 11/1998 | Shelton et al. | |
| D403,414 S | 12/1998 | Shelton et al. | |

(Continued)

OTHER PUBLICATIONS

International Search Report and Written Opinion for PCT/US2009/054560 dated Oct. 13, 2009, 11 pages.

(Continued)

*Primary Examiner* — James Pilkington
*Assistant Examiner* — Thomas Diaz
(74) *Attorney, Agent, or Firm* — Thompson Coburn LLP

(57) ABSTRACT

A bearing is disclosed. The bearing has an inner ring concentrically disposed with an outer ring with rotational elements therebetween adapted for allowing rotational movement of the inner ring relative to the outer ring. The outer ring has a crowned outer surface. A waveform expansion sleeve is disposed about the outer ring. The waveform expansion sleeve has a cylindrical outer surface dimensioned to be received in a bore of a bearing housing and an inner surface with a profile matching the outer ring outer surface. The waveform expansion sleeve has an undulating radial cross-section sufficient to exert radial pressure at its inner surface against the outer ring outer surface when mounted in the bore of the bearing housing to sufficiently secure the bearing in the housing. The expansion sleeve inner surface forms a seal with the outer ring outer surface when the bearing is installed in the bearing housing.

4 Claims, 3 Drawing Sheets

U.S. PATENT DOCUMENTS

| | | |
|---|---|---|
| 5,857,782 A * | 1/1999 | Waskiewicz .................. 384/493 |
| 5,906,164 A | 5/1999 | Bildtsen |
| D436,117 S | 1/2001 | Chuang |
| D444,802 S | 7/2001 | Dyson et al. |
| 6,288,878 B1 | 9/2001 | Misso et al. |
| 6,488,412 B1 | 12/2002 | Horng |
| D484,518 S | 12/2003 | Jiang |
| D490,447 S | 5/2004 | Ronfeldt et al. |
| 6,889,956 B2 | 5/2005 | Gutierrez et al. |
| 6,939,052 B1 | 9/2005 | Hull |
| 6,988,832 B2 | 1/2006 | DeWachter et al. |
| 7,007,386 B1 * | 3/2006 | Stover ........................... 384/535 |
| 7,093,981 B2 | 8/2006 | Masui et al. |
| D530,807 S | 10/2006 | Miyagishima et al. |
| D533,265 S | 12/2006 | Fiello et al. |
| 7,223,020 B2 | 5/2007 | Bauer et al. |
| 2004/0175066 A1 | 9/2004 | Chadwick et al. |
| 2005/0034900 A1 | 2/2005 | Swietlik |
| 2007/0096572 A1 | 5/2007 | Watkins et al. |
| 2007/0231136 A1 | 10/2007 | Hsu et al. |
| 2007/0262661 A1 | 11/2007 | Ai |

OTHER PUBLICATIONS

Co-pending U.S. Appl. No. 29/323,314 entitled Waveform Expansion Sleeve for a Bearing filed on Aug. 22, 2008.

* cited by examiner

WAVEFORM EXPANSION SLEEVE FOR A BEARING

BACKGROUND OF THE INVENTION

This application is directed to a waveform expansion sleeve for a bearing.

DETAILED DESCRIPTION OF THE PREFERRED EMBODIMENT

Figure 1:
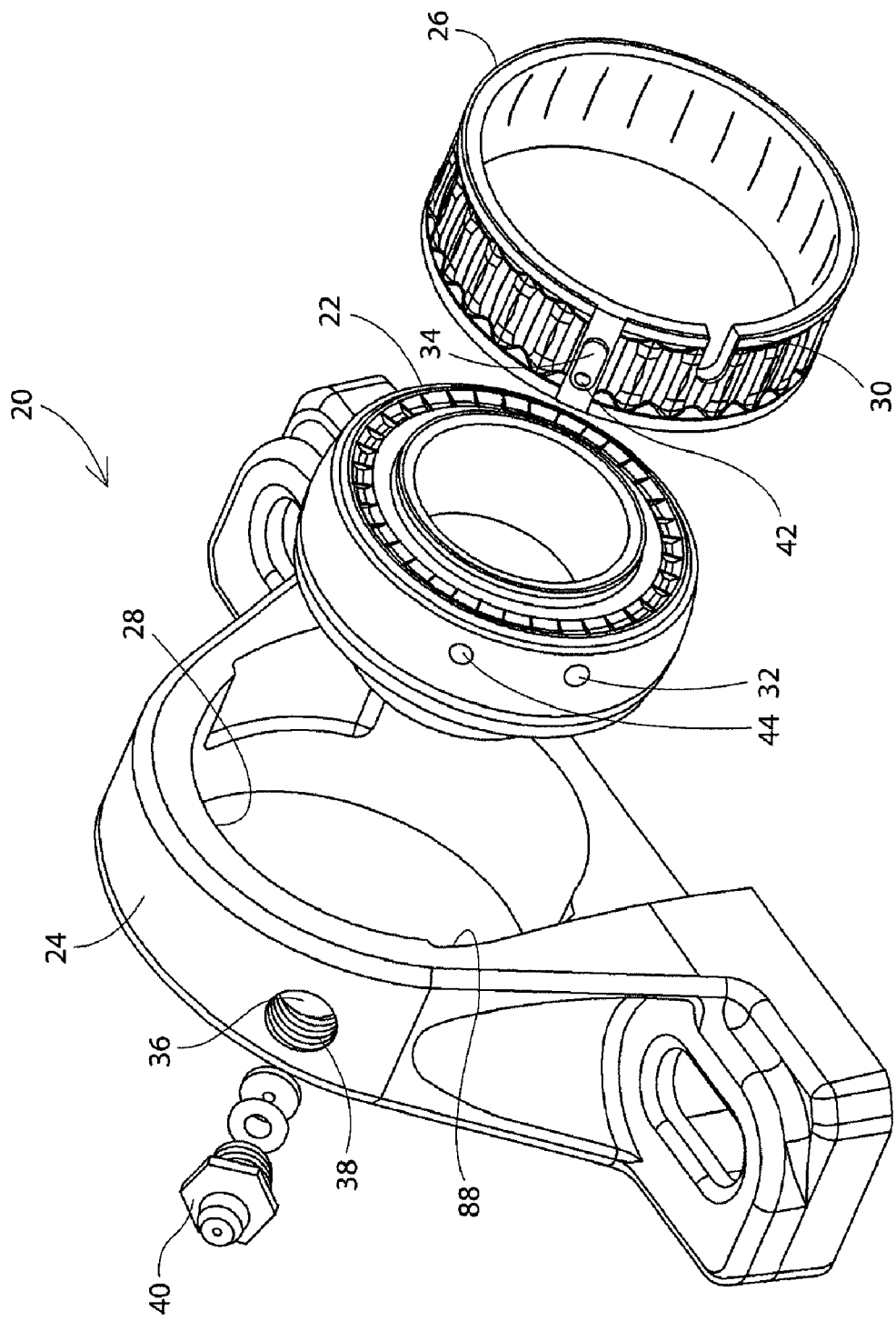
FIG. 1 is a perspective exploded view of a bearing assembly comprising a bearing housing, a bearing and a waveform expansion sleeve.

Referring to FIG. 1, a bearing assembly 20 comprises a bearing 22, a housing 24 for the bearing, and a waveform expansion sleeve 26. The bearing assembly 20 may comprise a pillow block bearing as shown in FIG. 1, or a flanged or take-up slot bearing assembly configuration. The housing 24 may be solid or split and the bearing assembly may be sealed or be provided with re-lubrication features. The bearing assembly 20 may be provided as a unit with the bearing factory installed in the housing. The bearing may be supplied separately to be assembled by an end-user with a housing, as needed. The materials used in connection with the bearing assembly widely vary depending upon the application, and may include polymers, steels, iron, and/or other cast materials.

The bearing housing 24 has a bore 28 which is sized and shaped to accommodate the waveform expansion sleeve 26 disposed around a bearing 22. When the bearing assembly is assembled and the waveform expansion sleeve 26 is constrained at diameter in the bearing housing bore 28, the waveform expansion sleeve exerts inward force upon the bearing sufficient to hold the bearing in position within the bearing assembly. The waveform expansion sleeve 26 and bearing 22 may have anti-rotational features 30,32 (respectively) to limit the relative motion between the bearing and the waveform expansion sleeve when the bearing assembly is assembled. The waveform expansion 26 sleeve and bearing housing 24 may also have anti-rotational features 34,36 (respectively) to limit the relative motion between the bearing housing and the waveform expansion sleeve when the bearing assembly is assembled. The bearing housing 24 may have a fitting hole 38 for accepting a lubrication fitting 40 that extends through the bearing housing bore to allow the fitting to be placed in register with lubrication ports 42,44 (respectively) formed on the waveform expansion sleeve and bearing.

Figure 2:
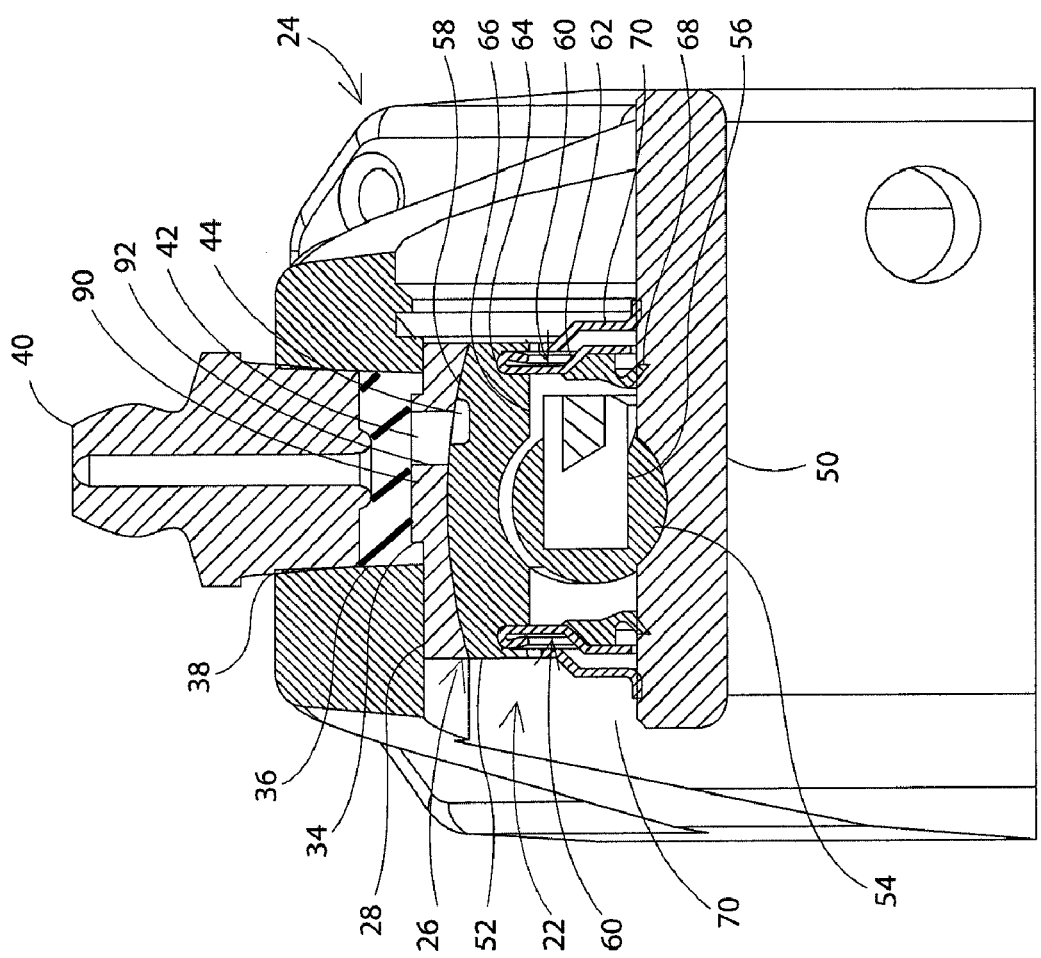
FIG. 2 is a cross-sectional view of the bearing assembly showing a cross section of the housing, the bearing and the waveform expansion sleeve.

Further detail of the bearing is shown in FIG. 2. The bearing 22 comprises an inner ring 50 concentrically disposed with an outer ring 52 with rotational elements 54 therebetween that allow rotational movement of the inner ring relative to the outer ring. As shown in FIG. 2, the rotational elements 54 comprise ball bearings constrained in a spaced circumferential orientation around the bearing with a cage 56. Other rotational elements, such as cylinders, tapered pins or rollers may also be used. The cage may comprise steel, nylon, or polymer materials, depending upon the application.

The inner ring 50 has a bore which is sized to accommodate a rotating shaft or other rotating element as may be dictated by a particular application. The outer ring 52 has an outer diameter surface 58 with a contour which is shaped to fit in the bearing waveform expansion sleeve 26, as described previously. In the configuration shown in the drawing figures, the inner ring rotates while the outer ring is held stationary. However, it should be appreciated that other configurations of the bearing may be used including fixing the inner ring and rotating the outer ring.

The bearing 22 has an internal seal 60 on axial sides of the bearing to prevent contaminants from interfering with the operation of the rotational elements. As shown in the drawing figures, the internal seal 60 comprises a support member 62 extending from a groove 64 formed on an inner diameter surface of the outer ring. At the distal end portion of the support member 62, a wiper 68 is fitted to engage an outer diameter surface of the inner ring. The wiper 68 shown has one edge to provide sealing contact with the inner ring outer diameter surface. Other configurations of wipers and wiper edges may be used depending upon the application. The internal seal 60 retains lubricant between the inner and outer rings and assists in preventing contamination ingress therebetween. The internal seal together with the grease acts as a labyrinth seal and filter to exclude contaminants from interfering with the operation of the rotational elements between the inner and outer ring. The orientation of the internal seal may also be reversed such that the support member may be attached to an outer diameter of the outer ring and the wiper may contact an inner diameter of the outer ring.

A flinger 70 may be provided on the exterior of the bearing adjacent the internal seal. The flinger acts as a shield to protect the internal seal. As shown in FIG. 2, the flinger is secured to the inner ring and rotates with the inner ring to assist in repelling debris and contaminants. The flinger may also be secured to the outer ring. As shown, the bearing is provided with a flinger on both axial sides of the bearing. However, depending upon the application, a flinger may be used on one axial side of the bearing. The flinger may also have a shape which closely matches the internal seal support member to shield in the inner seal support and form a labyrinth seal therewith.

Figure 3:
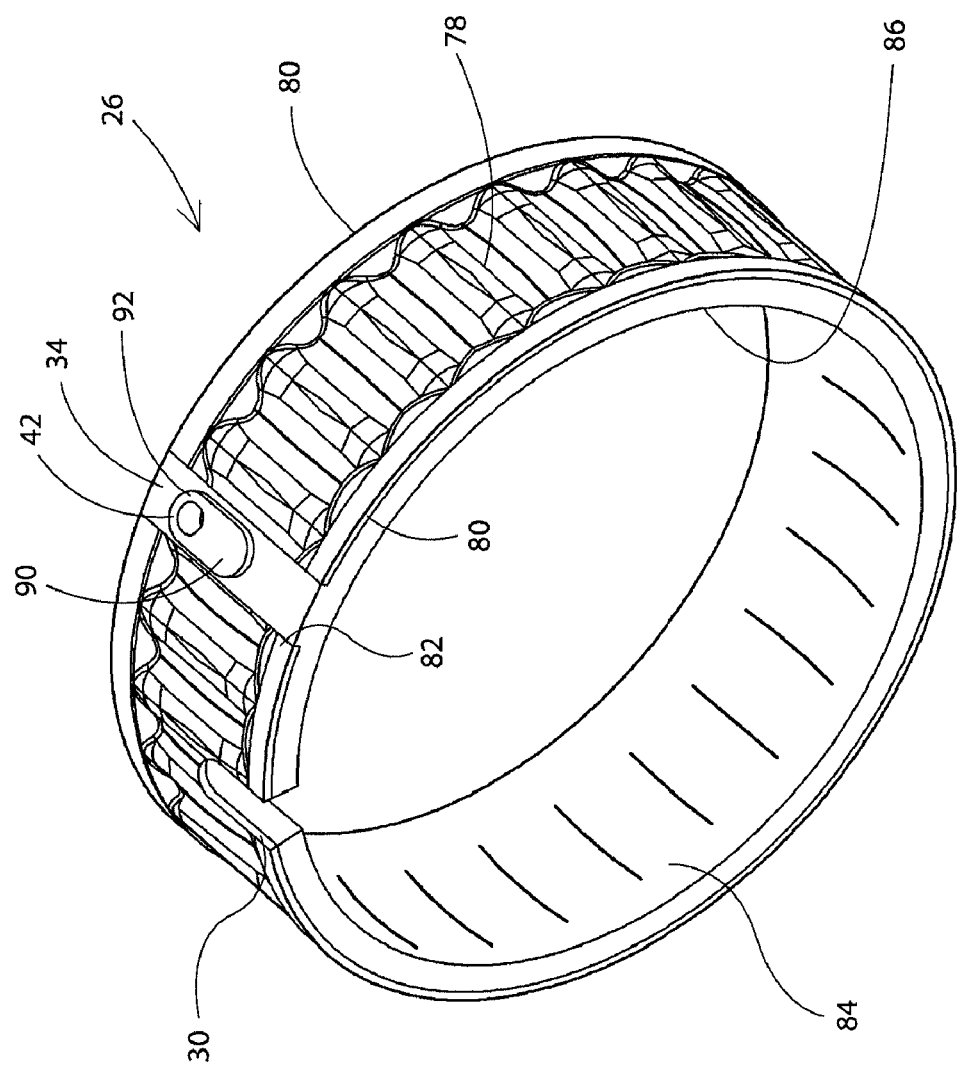
FIG. 3 is a perspective view of the waveform expansion sleeve of FIG. 1.

FIGS. 2 and 3 shows greater detail of the expansion sleeve 26. The expansion sleeve comprises a thin metal ring with an undulating cross-sectional area 78 that allows the sleeve to exert mounting force on the bearing outer ring 52 when the sleeve is constrained at a diameter. The waveform sleeve 26 may be formed from a strip of metal which is formed with the undulating cross-section 78 between two cylindrical bosses 80 on axial edges of the sleeve. The cylindrical bosses 80 on the axial edges of the sleeve may be formed as necessary to fit within the bearing housing bore 28. Preferably, the sleeve comprises a thin section strip of steel that is shaped into a wave form and then rolled into a ring with an end gap 82. Waves of the undulating wave form project from an inner diameter surface 84 of the sleeve. The sleeve inner diameter surface 84 may also be shaped to have a spherical contour. As shown in the drawing figures, the outer ring of the bearing has a crowned outer surface 58 thereby allowing the bearing to be used in a self-aligning application with the spherical inner diameter surface 84 of the waveform expansion sleeve. The thin section strip of metal used to form the expansion sleeve permits the use of cylindrical bearing housings in expansion bearing applications where the need for the bearing assembly to be the same size as other bearings in a power transmission systems along with self-aligning and/or self-centering features is required. However, it should be appreciated that other configurations of the waveform expansion sleeve inner diameter surface and bearing outer ring may also be used in accordance with the principles set forth in the disclosure.

Preferably, the inner surface 84 of the waveform expansion sleeve has a contour which closely matches the contour of the outer diameter surface 58 of the outer ring 52 thereby allowing the waveform expansion sleeve to form a seal with the outer ring when the bearing is installed in the bearing housing. To facilitate forming a seal between the bearing outer ring and the waveform expansion form, the inner diameter surface of the waveform expansion sleeve may be lined with a resilient material 86. For instance, a rubber material may be used on the inner diameter surface to assist in forming a seal and to provide vibration dampening. The resilient material may be molded such that the contour closely matches the contour of the outer ring. For instance, the waveform expansion sleeve may be formed with a cylindrical inner surface and the resilient material may be formed with a spherical inner surface or profile matching the outer ring outer surface. In the alternative, both the inner waveform expansion sleeve and the resilient material may be formed with a spherical inner surface.

FIGS. 1 and 3 show detail of the anti-rotational features 30,32 provided for the waveform expansion sleeve and the bearing. The waveform expansion sleeve anti-rotational feature 30 preferably comprises a notch extending through an axial side that is dimensioned to receive an anti-rotational pin 32 projecting from the bearing outer ring outer diameter surface. The anti-rotational pin is preferably dimensioned to prevent circumferential movement of the waveform expansion sleeve relative to the outer ring and may project from the notch to engage a slot 88 formed in the bearing housing bore. Axial movement of the bearing relative to the expansion sleeve may be reduced by closely matching the contour of the waveform expansion sleeve inner diameter surface and outer ring outer diameter surface. Grooves and other locating features may also be provided on the waveform expansion sleeve and bearing outer ring outer diameter surface to limit axial movement therebetween. It should be appreciated that the notch and pin features shown in the drawings may be reversed.

FIGS. 2 and 3 provide detail of the lubrication port 42 formed on the waveform expansion sleeve. The lubrication port 42 is preferably molded in the end gap 82 of the expansion sleeve. Preferably, the lubrication port 42 comprises a key 90 projecting from the outer diameter surface of the expansion sleeve. Preferably, the key has a hole 92 extending through the outer diameter surface to the inner diameter surface of the sleeve such that the bearing housing lubrication fitting 40 is brought into register with the waveform expansion sleeve key hole 92 when the bearing is installed in the bearing housing. In that regard, the anti-rotational pin 32 on the bearing and anti-rotational notch 30 on the sleeve may be formed in a keying arrangement with the lubrication port 42 of the waveform sleeve, the lubrication port 44 of the bearing, and the lubrication fitting 40 of the housing to ensure correct assembly of the bearing assembly.

FIGS. 1, 2 and 3 show greater detail of the anti-rotational features 34,36 of the waveform expansion sleeve and bearing housing. As shown in FIG. 2, the bearing housing lubrication fitting 40 extends partially into the fitting hole 38. The key 90 of the waveform expansion sleeve then projects into the fitting hole 38 in such a way so as to prevent rotation of the expansion sleeve relative to the bearing housing. The key 90 may also be shaped and configured to limit axial movement of the expansion sleeve relative to the bearing housing. In this way, the lubrication fitting 40 of the bearing housing may communicate directly with the lubrication port 44 of the bearing via the waveform expansion sleeve key hole 92 to allow the bearing to be re-lubricated as necessary. While the drawing figures show a key associated with the expansion sleeve projecting into the bearing housing lubrication fitting hole, the features may be reversed, for instance, the fitting may extend through the fitting hole a distance sufficient to engage a detent on the waveform expansion sleeve.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

What is claimed is:

1. A bearing comprising:
   an inner ring concentrically disposed with an outer ring with rotational elements therebetween adapted for allowing rotational movement of the inner ring relative to the outer ring, the outer ring having a crowned outer surface; and
   a waveform expansion sleeve disposed about the outer ring, the waveform expansion sleeve having a cylindrical outer surface dimensioned to be received in a bore of a bearing housing and an inner surface with a profile matching the outer ring outer surface, the waveform expansion sleeve having an undulating radial cross section that exerts radial pressure at its inner surface against the outer ring outer surface when mounted in the bore of the bearing housing to secure the bearing in the housing, the expansion sleeve inner surface forming a seal with the outer ring outer surface when the bearing is installed in the bearing housing;
   wherein the waveform expansion sleeve has an anti-rotational engagement portion on its outer surface shaped to engage a cooperating anti-rotational engagement of the bearing housing to prevent circumferential relative motion of the waveform expansion sleeve in the bearing housing when the bearing is installed in the housing;
   wherein the waveform expansion sleeve anti-rotational engagement portion has a lubrication hole extending through its inner surface and the expansion sleeve anti-rotational device is shaped to align the lubrication hole with a lubrication injection port of the bearing housing.

2. A bearing comprising:
   an inner ring concentrically disposed with an outer ring with rotational elements therebetween adapted for allowing rotational movement of the inner ring relative to the outer ring, the outer ring having a crowned outer surface; and
   a waveform expansion sleeve disposed about the outer ring, the waveform expansion sleeve having a cylindrical outer surface dimensioned to be received in a bore of a bearing housing and an inner surface with a profile matching the outer ring outer surface, the waveform expansion sleeve having an undulating radial cross-section that is radially deflectable to exert mounting force for the bearing in the housing when the bearing is mounted in the bearing housing bore, the expansion sleeve having a lubrication channel shaped to align with a lubrication injection port of the bearing housing when the bearing is installed in the housing;

wherein the waveform expansion sleeve has a resilient lining on its inner surface that forms a seal with the outer ring outer surface when the bearing is installed in the housing; and wherein a portion of the resilient lining projects radially outward from the expansion sleeve to form the lubrication channel.

3. The bearing of claim 2, wherein the radially outward projecting portion of the resilient lining has a hole that aligns with the bearing housing injection port when the bearing is installed in the housing.

4. A bearing assembly comprising:

a bearing housing with a bore sized to receive a bearing therein; and the bearing comprising an inner ring concentrically disposed with an outer ring with rotational elements therebetween adapted for allowing rotational movement of the inner ring relative to the outer ring, the outer ring having a crowned outer surface; and a waveform expansion sleeve disposed about the outer ring, the waveform expansion sleeve having a cylindrical outer surface dimensioned to be received in bearing housing bore and an inner surface with a profile matching the outer ring outer surface, the waveform expansion sleeve having an undulating radial cross-section that is radially deflectable to secure the bearing in the bearing housing bore, the expansion sleeve having a lubrication channel communicating with a lubrication injection port of the bearing housing;

wherein the expansion sleeve has a resilient lining on its inner surface that forms a seal with the outer ring outer surface; and wherein a portion of the resilient lining projects radially outward from the expansion sleeve to form the lubrication channel.

* * * * *

UNITED STATES PATENT AND TRADEMARK OFFICE
CERTIFICATE OF CORRECTION

PATENT NO. : 8,157,450 B2
APPLICATION NO. : 12/196689
DATED : April 17, 2012
INVENTOR(S) : Christopher E. Hosmer et al.

It is certified that error appears in the above-identified patent and that said Letters Patent is hereby corrected as shown below:

In Claim 4, column 5, line 16, replace "ther-" with --there- --.

In Claim 4, column 5, line 17, replace "ebetween" with --between--.

In Claim 4, column 6, line 3, after "in", insert --the--.

Signed and Sealed this
Twelfth Day of June, 2012

David J. Kappos
*Director of the United States Patent and Trademark Office*